(12) United States Patent
Larson et al.

(10) Patent No.: US 7,251,773 B2
(45) Date of Patent: Jul. 31, 2007

(54) BEACON TO VISUALLY LOCATE MEMORY MODULE

(75) Inventors: Thane Michael Larson, Roseville, CA (US); Ken Gary Pomaranski, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 422 days.

(21) Appl. No.: 10/633,213

(22) Filed: Aug. 1, 2003

(65) Prior Publication Data

US 2005/0028068 A1    Feb. 3, 2005

(51) Int. Cl.
    *G11C 29/00*    (2006.01)
    *G06F 7/00*    (2006.01)

(52) U.S. Cl. .................. 714/805; 714/763; 714/807; 701/301; 701/207

(58) Field of Classification Search ............... 714/763, 714/773, 43, 7, 704, 718, 52, 764, 807; 710/392; 712/200; 701/207, 301; 340/505
See application file for complete search history.

(56) References Cited

U.S. PATENT DOCUMENTS

| | | | | |
|---|---|---|---|---|
| 4,493,081 A | * | 1/1985 | Schmidt ................. | 714/754 |
| 5,881,072 A | * | 3/1999 | Dell ....................... | 714/763 |
| 5,953,243 A | | 9/1999 | Capps et al. | |
| 6,038,380 A | * | 3/2000 | Wise et al. ............. | 712/200 |
| 6,047,343 A | * | 4/2000 | Olarig ..................... | 710/302 |
| 6,282,689 B1 | * | 8/2001 | Seyyedy ................. | 714/773 |
| 6,299,068 B1 | * | 10/2001 | Berney ................... | 235/487 |
| 6,330,637 B1 | | 12/2001 | Ryan | |
| 6,330,696 B1 | | 12/2001 | Zorian et al. | |
| 6,467,048 B1 | * | 10/2002 | Olarig et al. ........... | 714/7 |
| 2002/0016942 A1 | * | 2/2002 | MacLaren et al. ..... | 714/718 |
| 2002/0184385 A1 | * | 12/2002 | Kato ....................... | 709/237 |
| 2003/0163769 A1 | * | 8/2003 | Phelps .................... | 714/43 |
| 2005/0081133 A1 | * | 4/2005 | Mustapha et al. ...... | 714/768 |

\* cited by examiner

*Primary Examiner*—Guy Lamarre
*Assistant Examiner*—Fritz Alphonse (57) ABSTRACT

One embodiment disclosed relates to a method of visually locating a memory module. An electronic communication is received by circuitry on the memory module to be visually located. A beacon state in the memory module is activated due to receipt of the electronic communication. A beacon device on the memory module is electronically turned on when the beacon state is activated to draw attention to that memory module. Another embodiment disclosed relates to an apparatus to visually locate a memory module in a memory system with a plurality of memory modules. The apparatus includes a system board, a plurality of memory modules, and an LED unit on a memory module. The beacon unit includes a beacon device and control circuitry for turning on the beacon device when an electronic communication to turn on the beacon device is received by that memory module.

21 Claims, 8 Drawing Sheets

FIG. 6A
(Plan View)

FIG. 6B
(Perspective View)
(Button Down)

FIG. 6C
(Perspective View)
(Button Up)

BEACON TO VISUALLY LOCATE MEMORY MODULE

BACKGROUND OF THE INVENTION

1. Field of the Invention

The present invention relates generally to computer systems. More particularly, the present invention relates to memory systems.

2. Description of the Background Art

In today's computer industry, dynamic random access memories (DRAMs) are one of the dominant memory technologies. DRAMs are the preferred choice for large main memories because they are inexpensive, fast and consume little power. DRAMs are typically manufactured in discrete semiconductor packages having different input/output (I/O) data widths of, for example, sixteen, thirty-two, or sixty-four, or more data bits.

The number of data bits that a computer can simultaneously address and manipulate, i.e., the computer bus width, is typically much larger than that commonly available with DRAMs. To accommodate these bus widths, groups of DRAMs are typically packaged together to form memory modules, such as, for example, DIMMs (Dual In-line Memory Modules) and other types of memory modules.

Figure 1A:
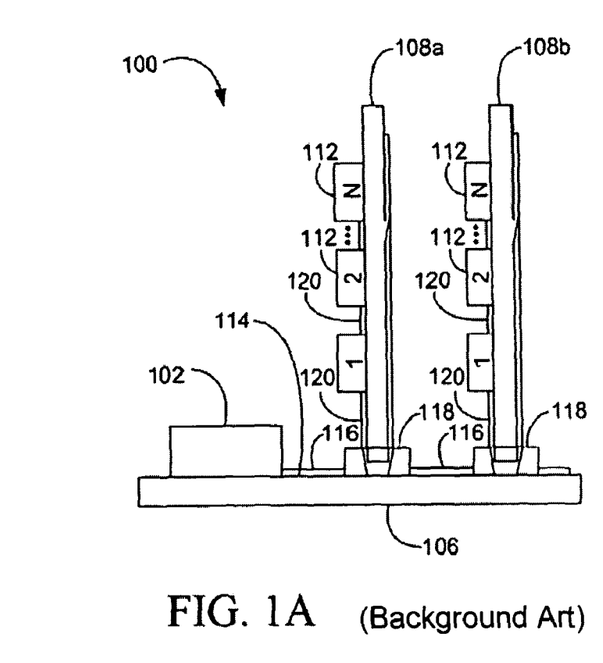
FIG. 1A shows a side view of a conventional memory system having two DIMM modules.

FIG. 1A shows a side view of a conventional memory system 100 with two DIMM modules. The memory system 100 includes a CPU or memory controller 102 affixed to a motherboard 106 and two dual in line memory modules 108a and 108b. The two memory modules 108a-b shown each includes N memory devices 112 connected in parallel. Assuming for purposes of discussion that N is equal to eighteen, the eighteen memory devices 112a-N on each memory module 108a and 108b are connected to the memory controller 102 by a data bus 114, which includes board trace portions 116, a connectors 118 and a module trace portions 120.

Figure 1B:
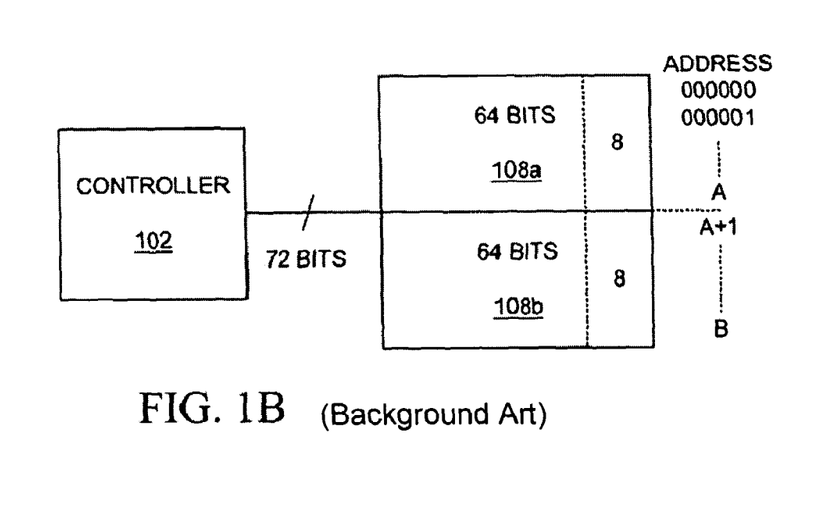
FIG. 1B shows a block diagram of the memory structure of the memory modules of the memory system shown in FIG. 1A.

FIG. 1B shows a block diagram of the memory structure of the memory modules of the memory system 100 shown in FIG. 1A. In FIG. 1B, the data bus is 72 bits wide where 64 bits are used for data and 8 bits are used for error correction. Each of the eighteen memory devices on the memory module 108a-b is 4 bits. The eighteen memory devices are connected in parallel so that for each memory operation, the output onto the data bus 114 is 72 bits wide.

Figure 1C:
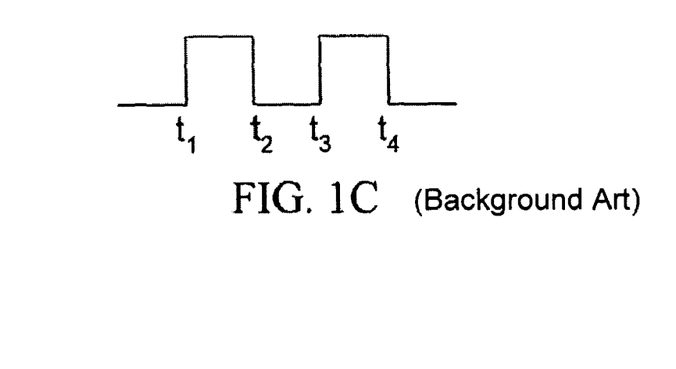
FIG. 1C shows a clock pulse for reading or writing to a memory location of the memory system shown in FIG. 1A.

FIG. 1C shows a clock pulse for reading or writing to a memory location of the memory system 100 shown in FIG. 1A. The memory controller 102 reads a single word or memory location from a single memory module at a time. Assuming a single data rate (SDR) system and a read operation, the memory location in memory module 108 having the address 000000 is read at the clock edge $t_1$. The contents of the memory location is 72 bits wide. No memory operation occurs at clock edge $t_2$. A second memory location having the address location 000001 in memory module 108 is read at the clock edge $t_3$.

Figure 2A:
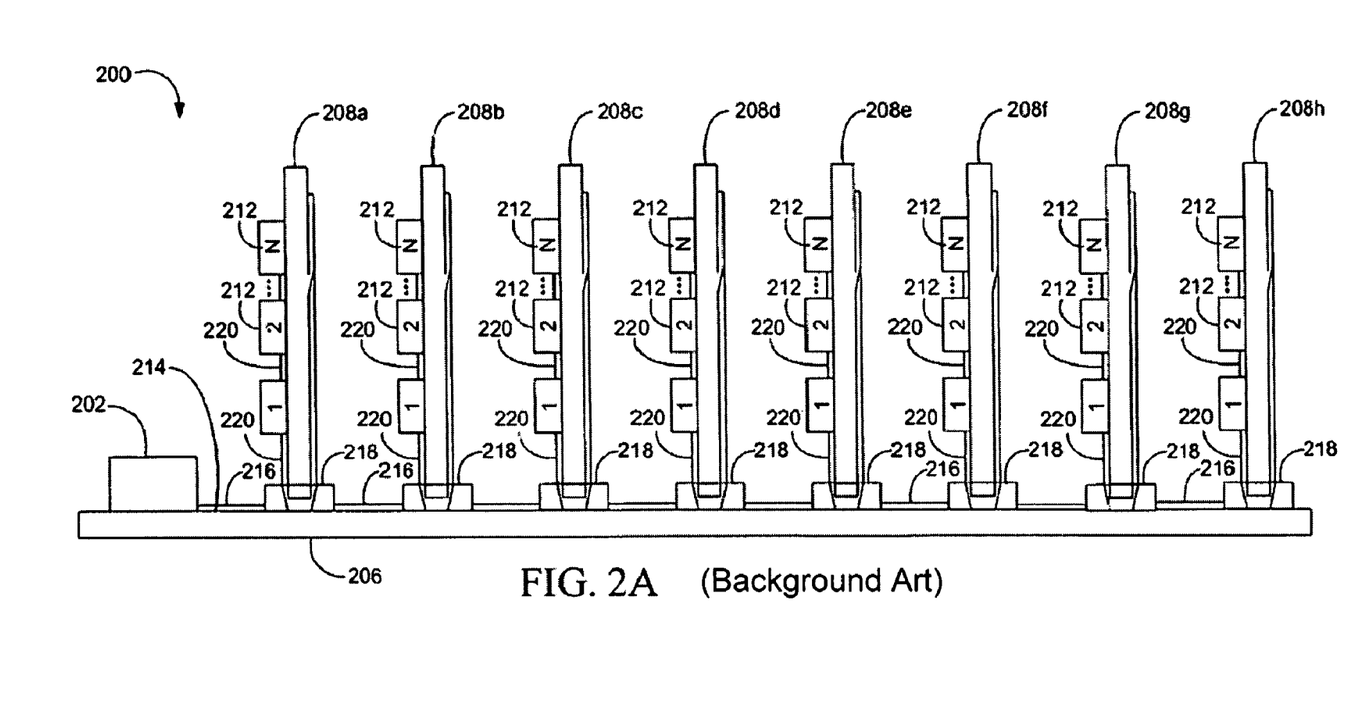
FIG. 2A shows a side view of a conventional memory system having eight DIMM modules.

FIG. 2A shows a side view of a conventional memory system 200 having eight DIMM modules. Similar to the configuration shown In FIG. 1A, the memory system 200 shown in FIG. 2A includes a CPU or memory controller 202 affixed to a motherboard 206. However, this configuration includes eight dual in line memory modules 208a-h instead of the two DIMMs 108a-b shown in FIG. 1A. The eight memory modules 208a-h shown each includes N memory devices 212, The memory controller 202 is connected to the eight memory modules 208a-h by a data bus 214, which includes board trace portions 216, connectors 218 and module trace portions 220.

Figure 2B:
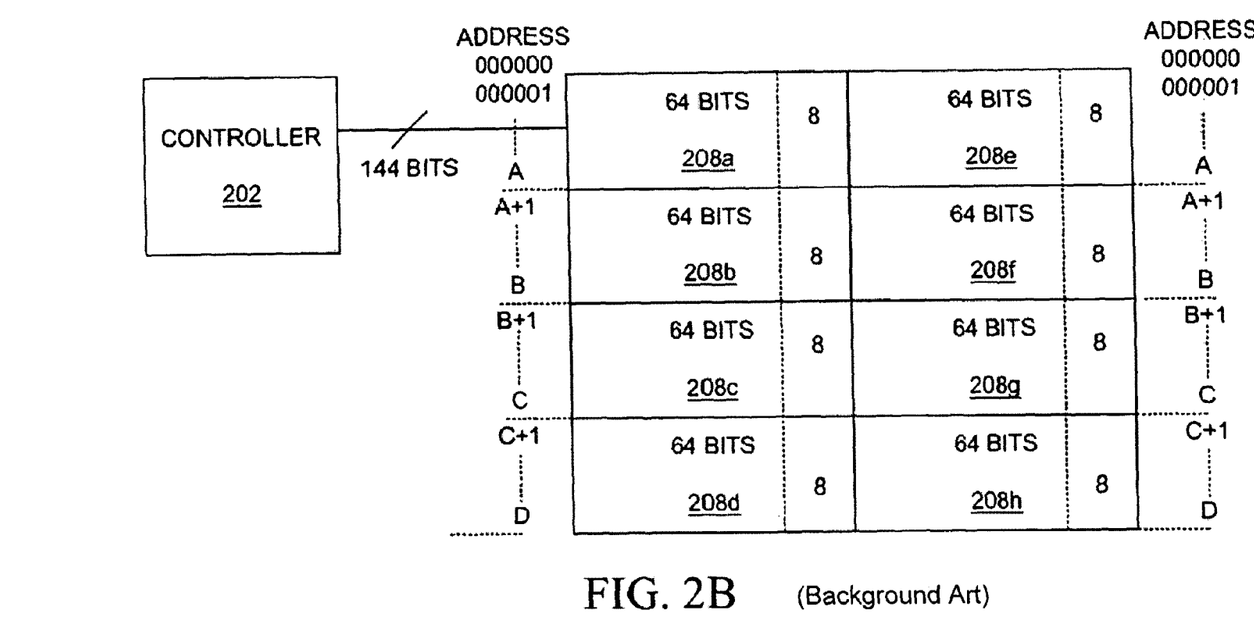
FIG. 2B shows a block diagram of the memory structure of the memory system shown in FIG. 2A.

FIG. 2B shows a block diagram of the memory structure of the memory system 200 shown in FIG. 2A. In the system shown, the data bus is 144 bits wide where 128 bits are used for data and 16 bits are used for error correction. Preferably each memory module Includes eighteen memory devices (N=18), each memory device being 4 bits wide. For each memory module, the memory devices are connected in parallel. Data is read from two memory modules simultaneously, so that for each memory operation, the output onto the data bus 214 is 144 bits wide.

Figure 2C:
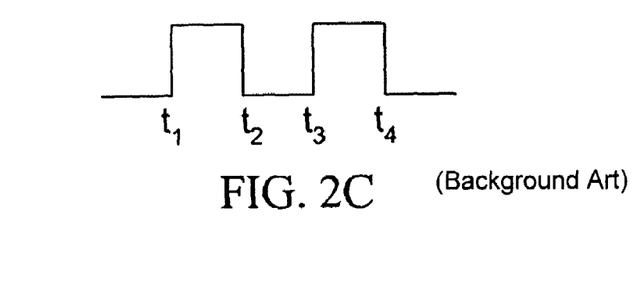
FIG. 2C shows a clock pulse for reading or writing to a memory location of the memory system shown in FIG. 2A.

FIG. 2C shows a clock pulse for reading or writing to a memory location of the memory system 200 shown in FIG. 2A. The memory controller 202 reads a single word or memory location from a single memory module at a time. Assuming a double data rate (DDR) system and a memory read operation, the memory location in memory module 208a having the address 000000 and the memory location in memory module 208e having the address 000000 are both read simultaneously at the clock edge $t_1$. A second memory location in memory module 208a having the address location 000001 and a second memory location having the address 000001 in memory module 208e are both read simultaneously at the clock edge $t_2$.

The above-discussed relatively simple memory systems are merely illustrative examples discussed for background purposes. There are numerous other memory system configurations, some much larger and more complex than those discussed above. With the ubiquity of memory systems in computer systems, improvements in the methods and apparatus for utilizing and maintaining such memory systems are highly desirable.

SUMMARY

One embodiment of the invention pertains to a method of visually locating a memory module. An electronic communication is received by circuitry on the memory module to be visually located. A beacon state in the memory module is activated due to receipt of the electronic communication. A beacon device on the memory module is electronically turned on when the beacon state is activated to draw attention to that memory module.

Another embodiment of the invention pertains to an apparatus to visually locate a memory module in a memory system with a plurality of memory modules. The apparatus includes a system board, a plurality of memory modules, and a beacon unit on a memory module. The system board includes a memory controller and a plurality of memory module slots on the system board. The plurality of memory modules are seated in the slots. The beacon unit includes a beacon device and control circuitry for turning on the beacon device when an electronic communication to turn on the beacon device is received by that memory module.

DETAILED DESCRIPTION

Most computer memory systems are made up of DRAMs that typically reside on individual DIMMs. Each DIMM is made up of a "set" of DRAMs, typically 32 to 36 in number, that plug into slots on a motherboard. A computer memory system may include anywhere from a few DIMMs (for example, in a personal computer or a small server) to thousands of DIMMs (for example, in a large server system). High end servers also typically include high availability features such as memory chip redundancy and hot swapping.

When a permanent memory error occurs (for example, a stuck-at bit, a stuck-open bit, or a "weak cell"), the location of the error is typically kept in system logs. The system logs reside in a central location such as a disk drive of the system, or on the system board. The system log typically tracks the logical DIMM number and DRAM location that has the error.

While identifying a particular memory module by its logical DIMM number is sufficient and useful for the operating system or other software, such identification is not directly useful for a repair technician or other person wishing to remove a faulty DIMM. Such identification for removal is especially useful for systems with hot-pluggable DIMMs. In order for a person to locate the DIMM corresponding to a memory error, the person must translate the logical DIMM number to a visually-identifiable slot location.

Previous ways to accomplish this translation include the following cumbersome techniques. First, a manual for the computer system may be reviewed to determine the mapping between the visually-identifiable locations and the logical numbers. This technique is disadvantageously time consuming and prone to human error. Furthermore, finding the manual may be difficult in remote areas or easily forgotten by a repair person.

Second, instead of consulting a manual, a web page or other external program may be used to map a logical DIMM number to a visually-identifiable location on the motherboard. This technique is also disadvantageously time consuming. In addition, this technique requires the creation and maintenance of the web page or external program. Furthermore, access to the web page or external program must be provided to a repair person in remote locations.

Third, a chassis may be labeled to visually correlate its DIMM slots to the logical DIMM numbers. This technique requires an extra step of labeling each of the DIMM slots with its corresponding logical DIMM number. Such labeling is tedious and may not be done accurately. Furthermore, this technique requires space on the chassis to attach the label, and such space may be limited, especially in compact systems.

Fourth, a diagnostics board may be used. The diagnostics board typically codes multiple failures within a few light emitting diodes (LEDs). A repair person or user should be trained to use the diagnostics board. Such a diagnostics board is usually used in combination with one of the above three methods, since using the diagnostics board alone is typically confusing to the user.

An embodiment of the present invention provides circuitry to electronically translate the logical DIMM number into a visually-identifiable DIMM location. In accordance with one embodiment, the DIMM location may be made visually-identifiable by electronically turning on or activating a light emitting device (LED) on the DIMM needing to be found. In another embodiment, the DIMM location may be made visually-identifiable by electronically turning on or activating an electromechanical flag type device. Advantageously, such the electromechanical device remains activated even in the absence of power to the device. The LED, electromechanical flag, or other beacon device that is turned on or activated serves as a "beacon" to rapidly draw the attention of a repair person or other user to that particular DIMM. This technique is advantageous over prior techniques because it simplifies DIMM identification and lowers the need for diagrams and documentation.

In one embodiment, the beacon device may comprise a fault indicator. The fault indicator beacon on a DIMM may be electronically turned on or activated under the control of system firmware to indicate that the DIMM includes a problematic memory fault. In another embodiment, the beacon device may comprise a locator. The locator beacon may be set by a user to provide a beacon to draw attention to a particular DIMM, whether or not that DIMM includes a memory fault. In another embodiment, each DIMM may include both a fault indicator beacon and a locator beacon. The two beacons may be, for instance, of different colors to clearly distinguish them. Instead of or in addition to the above, an embodiment of the invention may include circuitry on the DIMM such that the DIMM itself may self-diagnose problems and turn its fault indicator beacon on to draw attention of a repair person or user.

Figure 3:
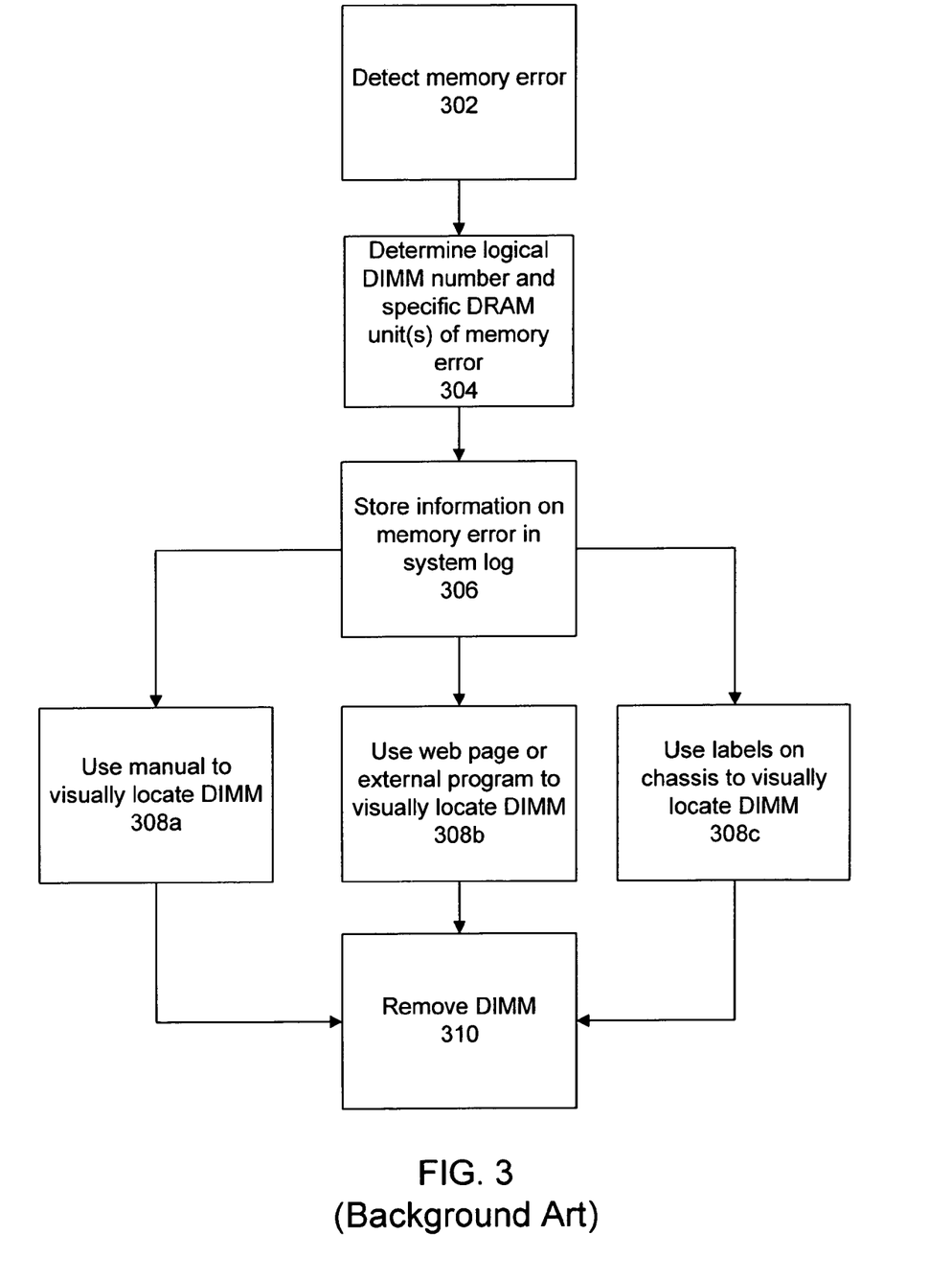
FIG. 3 is a flow chart of a conventional method of locating a faulty memory module.

FIG. 3 is a flow chart of a conventional method of locating a faulty memory module. Sometime during the operation of the computer system, a memory error is detected 302. The specific location of the memory error is determined 304. The memory error detection 302 and location determination 304 may be performed, for example, by the manageability processor. The specific location may be indicated as being at specific address(es) of specific DRAM(s) on a particular memory module. To track the memory error, the memory error information is stored 306 in a system log. The system log may be kept, for example, on the system board or on a system disk.

If a memory module with memory errors thereon is to be removed 310 for purposes of replacement or repair, then the memory module to be removed must first be visually located 308 by the repair technician or other user. As discussed above, there are conventional techniques to visually locate the memory module including: using a manual 308a; using a web page or an external program 308b; and using labels on the chassis 308c. Referring to a manual 308a is disadvantageously time consuming and prone to human error. Furthermore, finding the manual may be difficult in remote areas or easily forgotten by a repair person. Using a web page or an external program 308b technique is also disadvantageously time consuming. In addition, this technique requires the creation and maintenance of the web page or external program. Furthermore, access to the web page or external program must be provided to a repair person in remote locations. Using labels on the chasis 308c requires an extra step of labeling each of the DIMM slots with its corresponding logical DIMM number. Moreover, the labeling is tedious, may not be done accurately, and requires sufficient space on the chassis to attach the label.

Figure 4:
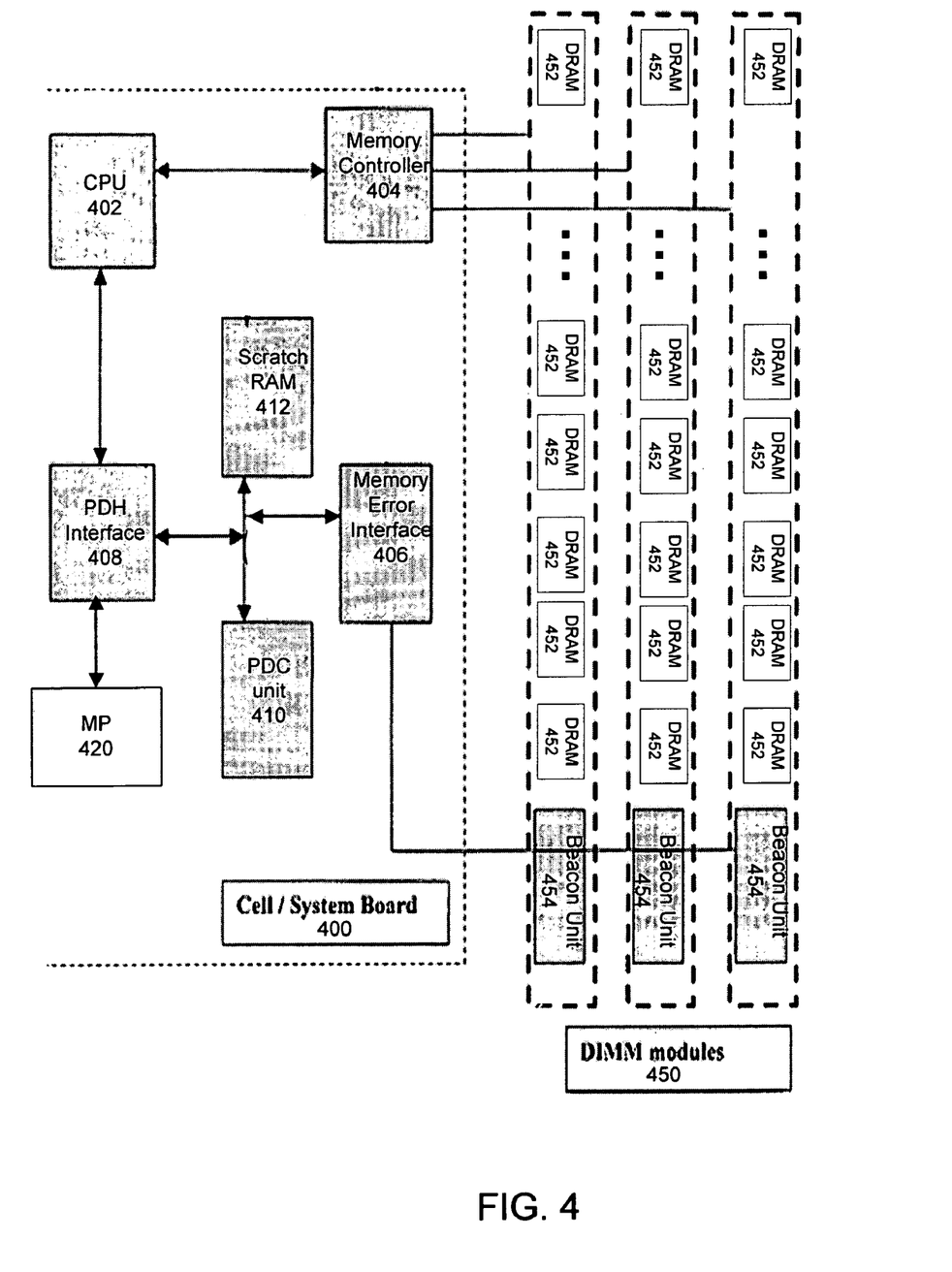
FIG. 4 is a schematic diagram of a system for drawing attention to a faulty memory module in accordance with an embodiment of the invention.

FIG. 4 is a schematic diagram of a system for drawing attention to a faulty memory module in accordance with an embodiment of the invention. The system includes a system board 400 and multiple DIMM modules 450. In some larger computing systems, the system board 400 may be referred to as a cell board 400.

The system board 400 includes various components. A central processor unit (CPU) 402 executes software instructions and operates as a "brain" that coordinates the operation of other components on the board 400. Although one CPU 402 is illustrated, an actual system may utilize a single CPU or multiple CPUs 402 for this functionality. The CPU 402 is shown as communicatively coupled to a memory controller 404 and a processor dependent hardware (PDH) interface 408. These communicative couplings may comprise, for example, a communications bus or other communications means. Other components (not illustrated) may also, of course, be communicatively coupled to the CPU 402, such as an input/output interface, a data storage interface, a display interface, and other devices.

The memory controller 404 is used to control the reading of data from and writing of data to the DRAM chips on the DIMM modules 450. The memory controller 404 may be implemented to operate, for example, similarly to the memory controllers discussed above in relation to FIGS. 1 and 2. The specific operation of the memory controller 404 will depend upon the specific characteristics of the memory being controlled (for example, whether the DRAM is asynchronous or synchronous, whether the DRAM is single data rate or double data rate, whether it is direct Rambus® DRAM (DRDRAM®), and so on). Embodiments of the present invention should not typically be limited to a particular type of DRAM.

In one embodiment, a manageability processor (MP) 420 may be included on the system board 400. The MP 420 may be used to control the monitoring of status, the logging of events and abnormal conditions, and the recovery capabilities in relation to the memory system. In one embodiment, the manageability processor 420 may be configured to be compliant with the intelligent platform management interface (IPMI) specification. The IPMI specification is currently available from Intel via the Internet by way of the following URL: http://www.intel.com/design/servers/ipmi/spec.htm. The Intelligent Management Platform provides functions that are available independent of the main processors, BIOS, and operating system. IPMI messaging uses a request/response protocol. IPMI request messages (also called commands) are grouped into functional command sets, using a field called the network function code. There are command sets for sensor and event related commands, chassis commands, and so on.

The PDH interface 408 allows the CPU 402 and/or the MP 420 to communicate with other components shown, including a processor dependent code (PDC) unit 410, scratch memory 412, and a memory error interface unit 406. In the embodiment illustrated in FIG. 4, the system board 400 includes both the CPU 402 and the MP 420 and both are communicatively coupled to the PDH interface 408. In another embodiment, the system board 400 includes both the CPU 402 and the MP 420, but only the MP 420 is communicatively coupled to the PDH interface 408. In another embodiment, the system board 400 includes only the CPU 402 and not the MP 420.

The PDH interface 408 may be implemented using a microcontroller. The PDC unit 410 may comprise a form of non-volatile memory, such as, for instance, flash memory or a type of read only memory (ROM). The PDC unit 410 may be configured to include boot code and error handling code that may be executed by the CPU 402 and/or the manageability processor 420. The scratch memory 412 may be implemented using volatile and/or non-volatile scratch RAM. The scratch memory 412 is utilized to temporarily store data.

The memory error interface 406 is communicatively coupled to the beacon units 454 on the DIMM modules 450. In one embodiment, the communicative coupling may be implemented using an IPMI bus. In another embodiment, the communicative coupling may be implemented using an I2C (Inter-IC) bus. Each beacon unit 454 may comprise one or more beacon devices and related control circuitry. The beacon devices may comprise LEDs, electromechanical flags, or other devices. In one embodiment, the beacon unit 454 may include a fault indicator beacon. In another embodiment, the beacon unit 454 may include a locator beacon. In another embodiment, the beacon unit 454 may include both a fault indicator beacon and a locator beacon. Other beacon types may also be included in other embodiments. If multiple beacon devices are included on a DIMM, different colors for the beacon devices may be used to more clearly distinguish them. For example, different color LEDs or different color electromechanical flags may be used. The beacon devices may be turned on or off by setting or resetting associated control registers in the beacon units 454.

The fault indicator beacon may be electronically turned on by system firmware to indicate that the DIMM includes a problematic memory fault. The locator beacon may be set by software on the computer system to provide a beacon to draw a user's attention to a particular DIMM, whether or not that DIMM includes a memory fault. Instead or in addition to the system firmware turning the beacon device(s) on, an embodiment of the invention may include circuitry on the DIMM such that the DIMM itself may self-diagnose problems and turn on its fault indicator beacon to draw attention of a repair person or other user.

There are at least three DIMM modules 450 depicted in FIG. 4, but embodiments of the present invention are not limited to a specific number of memory modules. Furthermore, although DIMMs 450 are depicted and discussed, embodiments of the present invention need not necessarily be limited to a specific type of memory module. Other types of memory modules include single in-line memory modules (SIMMs), Rambus in-line memory modules (RIMMs®), and others.

Each memory module 450 couples to the system board 400 by way of a memory slot. The memory slot is configured appropriately depending on the type of memory module. Again, while at least three memory slots are illustrated in FIG. 4, embodiments of the invention are not limited to a specific number of memory slots.

Each memory module 450 includes a plurality of DRAM chips 452 and a beacon unit 454. The DRAMs 452 comprise volatile memory in that they require the application of power to retain data therein. Each memory module 450 also includes circuitry configured to provide read and write access by the memory controller 404 to the DRAMs 452.

Each memory module also includes circuitry configured to provide read and write access to a control register on the beacon unit 454. In one embodiment, the read and write access to the control register is provided via a communications link to a memory error interface 406. Alternatively, the read and write access to the control register may be provided via a communications link to the memory controller 404, where the memory controller 404 is specially configured with capability to activate and deactivate the beacon state of the memory module 450.

Figure 5:
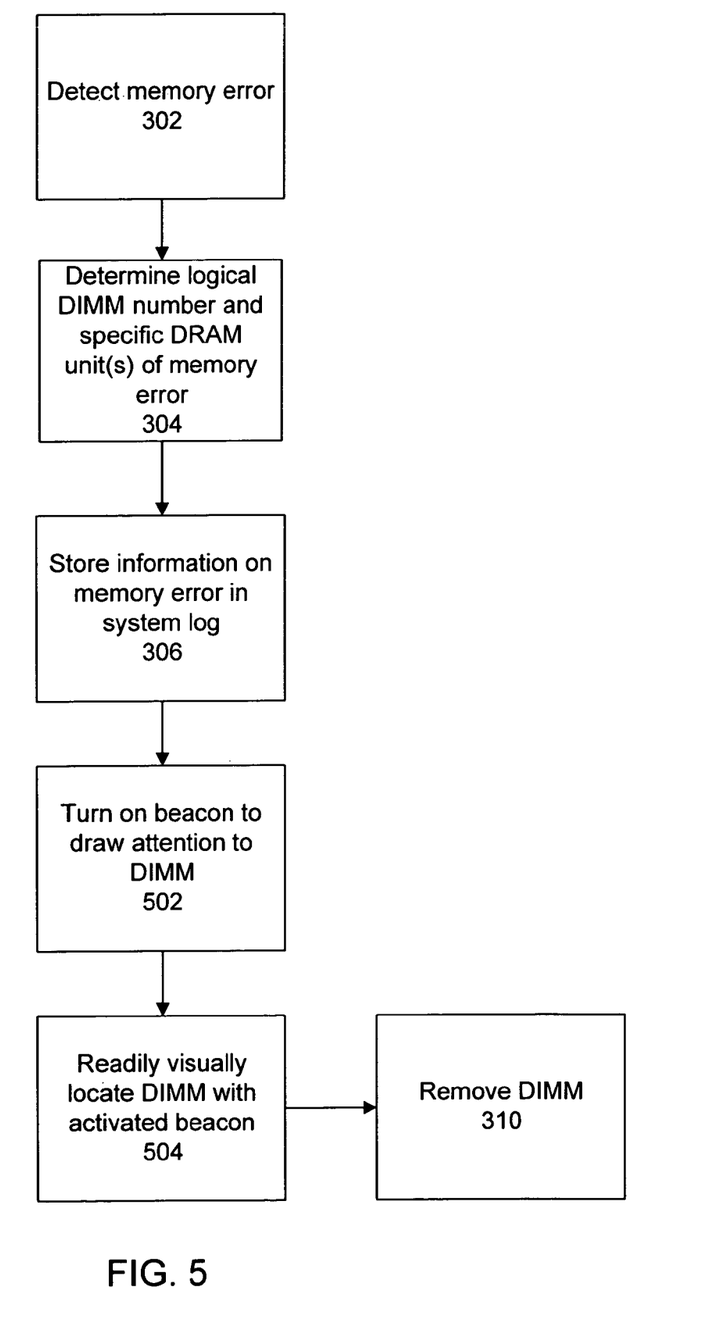
FIG. 5 is a flow chart of a method of locating a faulty memory module in accordance with an embodiment of the invention.

FIG. 5 is a flow chart of a method of locating a faulty memory module in accordance with an embodiment of the invention. This method is advantageous over the conventional method of FIG. 3.

Like in the conventional method of FIG. 3, sometime during the operation of the computer system, a memory error is detected 302. The specific location of the memory error is determined 304. The memory error detection 302 and location determination 304 may be performed, for example, by the operating system. The specific location may be indicated as being at specific address(es) of specific DRAM(s) on a particular memory module. To track the memory error, the memory error information is stored 306 in a system log. The system log may be kept, for example, on the system board or on a system disk.

In accordance with an embodiment of the invention, in addition to the memory error information being stored 306 in the system log, a beacon on the memory module is turned on 502 to draw the attention of a repair person or other person to the DIMM. The beacon device may be turned on by programming an associated control bit or flag in a register on that DIMM. The manageability processor may be configured to send communications to program the register on the DIMM for the beacon state. In addition, the operating system may be configured to access, through the manageability processor, the DIMM's beacon register to set the state. The beacon for a DIMM may be turned on, for example, by a system administrator or other user of the computer system to "flag" that DIMM, or by manageability or diagnostic applications.

With the beacon activated on the DIMM, a repair person or other person may readily visually locate 504 that DIMM from amongst the numerous DIMMs in a system. Once found, the DIMM may then be removed 310 for replacement or repair. The method of FIG. 5 is advantageous over prior techniques because it simplifies DIMM identification and lowers the need for diagrams and documentation.

Figure 6A:
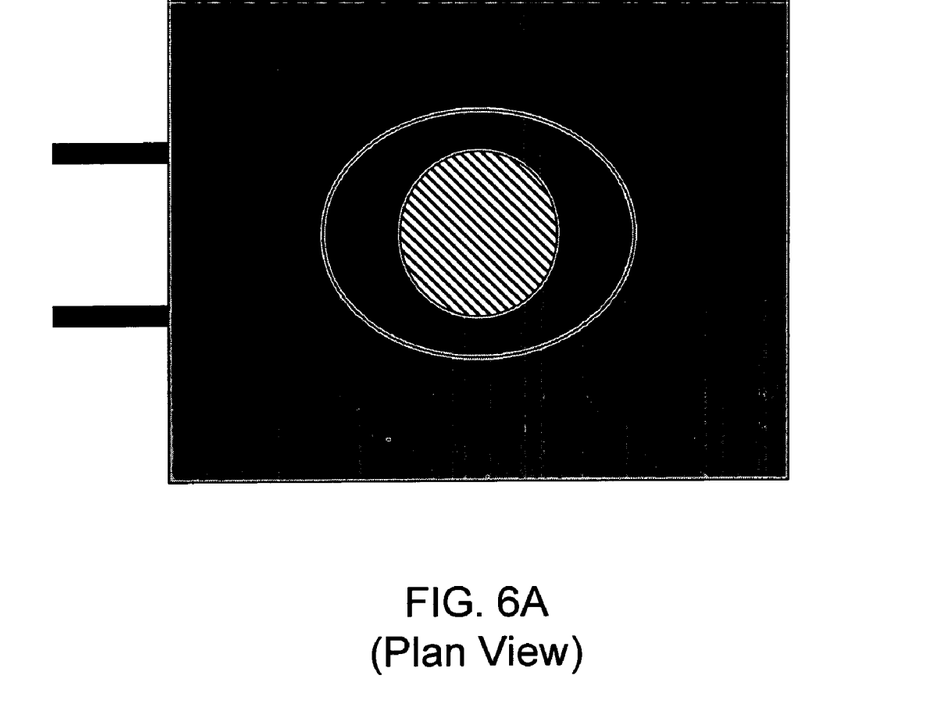
FIGS. 6A, 6B, and 6C depict an example electromechanical beacon device in accordance with an embodiment of the invention.
Figure 6B:
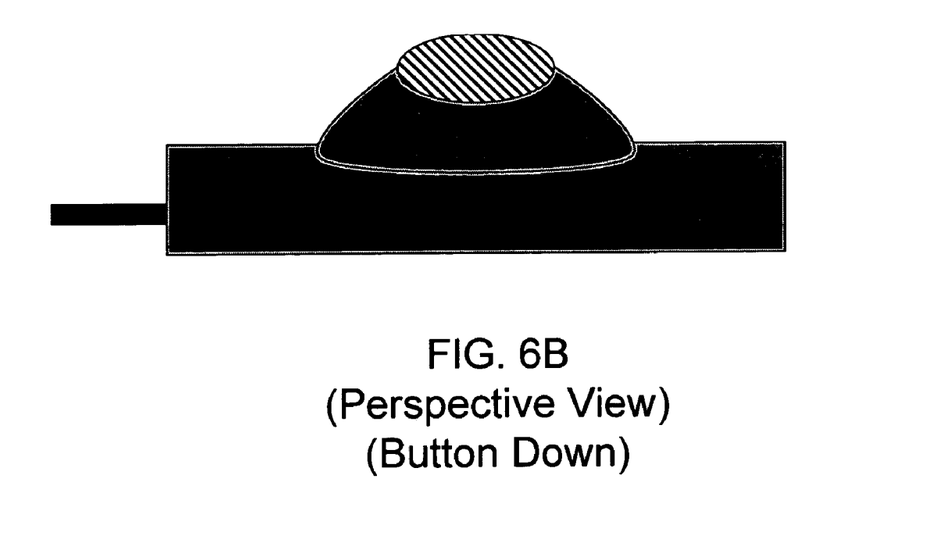
Figure 6C:
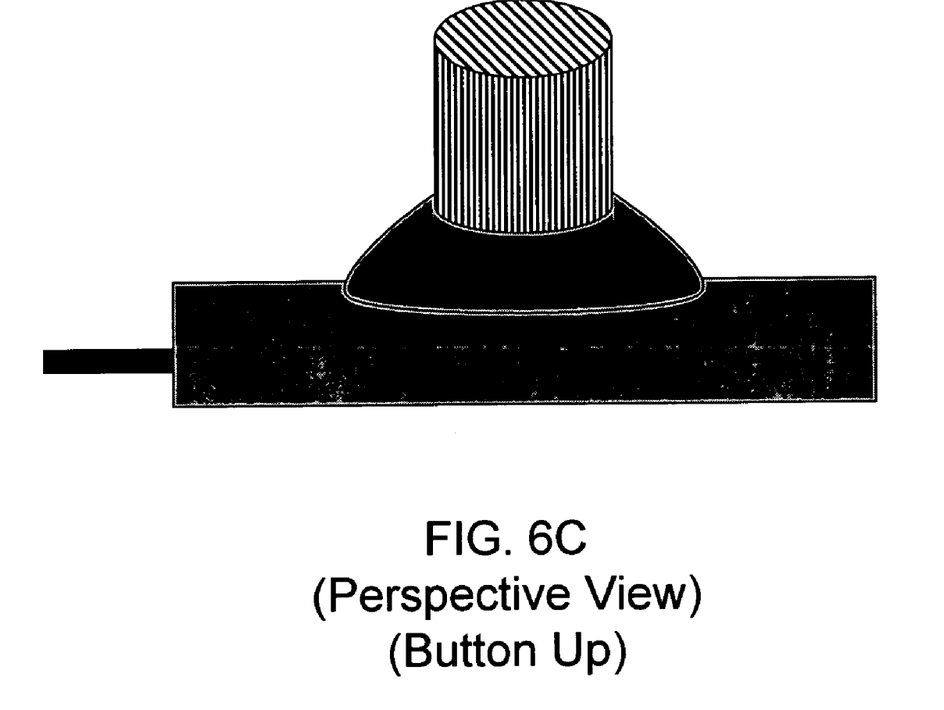

In accordance with an embodiment of the invention, an example electromechanical beacon device is depicted in FIGS. 6A, 6B, and 6C. In this example, the electromechanical device comprises an electromechanical button or flag. Switches or other forms of electromechanical devices may also be used. FIG. 6A is a plan view (top view) of the example electromechanical device. FIG. 6B is a perspective view (side view) of the device with the electromechanical button or flag in the down (deactivated) position. FIG. 6C is a perspective view (side view) of the device with the electromechanical button or flag in the up (activated) position.

Such electromechanical devices are particularly advantageous in that they do not require the application of power to the device in order to stay in an activated or "turned on" state. For example, during repair, often times power is removed from the system chassis. With such an electromechanical beacon device, the "flag" may be "popped" (like a circuit breaker) when activated. It will remain in the popped position, whether or not power is applied, until it is reset by a repair person or other user.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of visually locating a memory module, the method comprising:
    detecting a memory error;
    determining a logical memory module number of the memory error;
    sending an electronic communication to a memory module corresponding to the logical memory module number;
    receiving the electronic communication by circuitry on the memory module
    activating a beacon state in the memory module due to receipt of the electronic communication; and
    electronically turning on a beacon device on the memory module when the beacon state is activated to draw attention to that memory module,
    wherein the beacon device comprises an electromechanical device which visibly shows the beacon state when activated and that remains activated even in the absence of power.

2. The method of claim 1, wherein the electronic communication is sent by a memory error interface on a system board.

3. The method of claim 1, wherein the beacon state is activated by programming a flag bit in a register on the memory module.

4. The method of claim 1, further comprising:
    using a software application configured with capability to initiate sending the electronic communication to the memory module.

5. The method of claim 4, wherein the software application comprises a type of application from a group of types including manageability applications and diagnostic applications.

6. The method of claim 1, wherein the electronic communication is sent from self-diagnostic circuitry on the memory module.

7. An apparatus to visually locate a memory module in a memory system with a plurality of memory modules, the apparatus comprising:

a system board including a memory controller and a plurality of memory module slots on the system board;

a plurality of memory modules seated in the plurality of memory module slots;

a memory error interface unit on the system board that is configured to send an electronic communication to the memory module; and a beacon unit on the memory module with a beacon device and control circuitry for turning on the beacon device when the electronic communication to turn on the beacon device is received by the memory module, wherein the beacon device comprises an electromechanical device which visibly shows the beacon state when activated and that remains activated even in the absence of power.

8. The apparatus of claim 7, wherein the memory modules comprise dual in-line memory modules (DIMMs).

9. The apparatus of claim 7, wherein the memory modules comprise single in-line memory modules (SIMMs).

10. The apparatus of claim 7, wherein the memory modules comprise Rambus in-line memory modules (RIMMs).

11. The apparatus of claim 7, wherein the system board comprises a computer motherboard.

12. The apparatus of claim 7, wherein the system board comprises a cell board.

13. The apparatus of claim 7, further comprising a manageability processor communicatively coupled to the memory error interface.

14. The apparatus of claim 13, wherein the manageability processor is compatible with an intelligent platform management interface (IPMI).

15. The apparatus of claim 7, wherein the electronic communication is sent by the memory controller to the memory module.

16. The apparatus of claim 7, wherein the beacon unit further comprises a second beacon device and control circuitry for turning on the second beacon device.

17. The apparatus of claim 16, wherein the beacon device and the second beacon device are of different colors to visually distinguish them.

18. The apparatus of claim 7, wherein each of the memory modules includes a corresponding beacon unit.

19. The apparatus of claim 7, further comprising a software application configured with capability to initiate sending the electronic communication to the memory module.

20. The apparatus of claim 7, further comprising self-diagnostic circuitry on the memory module that is configured with capability to turn on the electromechanical beacon device on that memory module.

21. A system for visually locating a memory module, the system comprising:

a memory error interface unit on the system board that is configured to send an electronic communication to a memory module; and means for receiving the electronic communication by circuitry on the memory module means for activating a beacon state in the memory module due to receipt of the electronic communication; and means for electronically turning on a beacon device on the memory module when the beacon state is activated to draw attention to that memory module, wherein the beacon device comprises an electromechanical device that remains activated even in the absence of power.

* * * * *

UNITED STATES PATENT AND TRADEMARK OFFICE
CERTIFICATE OF CORRECTION

| | |
|---|---|
| PATENT NO. | : 7,251,773 B2 |
| APPLICATION NO. | : 10/633213 |
| DATED | : July 31, 2007 |
| INVENTOR(S) | : Thane Michael Larson et al. |

It is certified that error appears in the above-identified patent and that said Letters Patent is hereby corrected as shown below:

In column 9, line 6, in Claim 7, delete "the" and insert -- a --, therefor.

In column 10, line 20, in Claim 21, delete "a" and insert -- the --, therefor.

In column 10, line 21, in Claim 21, after "module;" delete "and".

Signed and Sealed this

Eighth Day of July, 2008

JON W. DUDAS
*Director of the United States Patent and Trademark Office*